United States Patent

[11] 3,551,607

[72] Inventors Giovanni Battista Tommasi
Milan, Italy;
Marco Zanuso, Milan, Italy

[21] Appl. No. 693,261
[22] Filed Dec. 26, 1967
[45] Patented Dec. 29, 1970
[73] Assignee Societa Italiana Telecomunicazioni Siemens S.p.A.
Milan, Italy
a corporation of Italy
[32] Priority May 4, 1962, Apr. 9, 1963
[33] Italy
[31] A 23,080 and 84,252
Continuation-in-part of application Ser. No. 275,962, Apr. 26, 1963, now abandoned.

[54] PIVOTABLE TELEPHONE HANDSET
9 Claims, 5 Drawing Figs.

[52] U.S. Cl. 179/100, 179/103
[51] Int. Cl. H04n 1/02
[50] Field of Search 179/100, 100D, 100C, 102, 103, 101, 100L, 100.1DR, 100.1A

[56] References Cited

UNITED STATES PATENTS

| | | | |
|---|---|---|---|
| 1,298,771 | 4/1919 | Nash et al. | 179/103 |
| 3,073,911 | 1/1963 | Mattke et al. | 179/100 |

FOREIGN PATENTS

| | | | |
|---|---|---|---|
| 740,836 | 11/1932 | France | 179/103 |
| 822,251 | 11/1951 | Germany | 179/103 |

*Primary Examiner*—Kathleen H. Claffy
*Assistant Examiner*—Randall P. Myers
*Attorney*—Karl F. Ross

ABSTRACT: Telephone handset divided into two parts of unequal length which are hingedly interconnected and, in a folded position, can stand flat on a table by means of a pair of coplanar bottom surfaces in the region of the hinge, the longer part terminating in a head which overhangs a dial and carries an earpiece standing clear of the shorter part when the handset is folded up, the latter part carrying a mouthpiece confronting the dial in the folded position.

INVENTORS
Giovanni Battista Tommasi
and Marco Zanuso
BY
Karl G. Ross
Attorney

INVENTORS
Giovanni Battista Tommasi
and Marco Zanuso
BY
Karl F. Ross
Attorney

INVENTORS
Giovanni Battista Tommasi
and Marco Zanuso
BY
Karl F. Ross
Attorney

PIVOTABLE TELEPHONE HANDSET

This application is a continuation-in-part of our copending application Ser. No. 275,962 filed 26 Apr. 1963, now abandoned.

Our present invention relates to a foldable telephone handset in which the transmitting portion or mouthpiece and the receiving portion or earpiece are carried on two hingedly interconnected parts.

The general object of this invention is to provide a telephone set of light weight and compact construction which can be easily carried from one location to another.

It is also an object of this invention to provide a foldable telephone set which, when not in use, can be conveniently stored in a standing, lying or hanging position.

A further object is to provide a telephone set whose sensitive mechanically movable parts, such as a dial or equivalent call-sector means, are protected against accidental damage or tampering in the position of nonuse.

In order to realize these objects, the telephone set according to the present invention—referred to hereinafter as "handset"—consists of two rigid parts articulatedly connected to one another by a hinge, these parts being of unequal length so that the free end of one of them projects beyond the free end of the other part. The projecting free end is advantageously shaped in the form of an overhanging head carrying one of the two transducers of the set, i.e. either the transmitter or the receiver, preferably the latter. The other transducer, preferably the transmitter or mouthpiece, is mounted on the shorter part so as to be closer to the hinge than to the earpiece, this arrangement being very convenient in operation when the receiver is held onto the ear of a user speaking into the mouthpiece. The relatively long stem portion of the longer part may be used to accommodate the call sector, e.g. a dial, so that this selector confronts the mouthpiece when the parts are folded up and the handset is in its rest position. A so-called hook switch responding to the folding and unfolding of the set, operates in the talking position to connect the transducers to an external line; reference in this connection may be made to commonly assigned application Ser. No. 590,865, filed 31 Oct. 1966 by Agostino Ferrari, Luciano Callegari and Gianfranco Rivetta, showing details of such a switch, and to the corresponding Italian Pat. No. 778,676.

Figure 1:
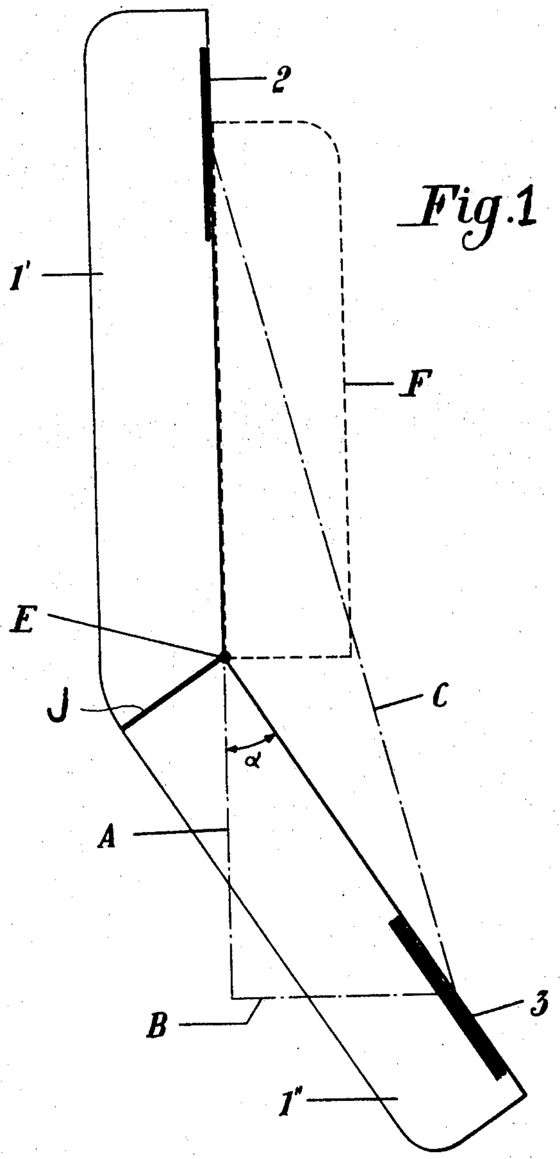

The invention will now be described in greater detail with reference to the accompanying drawing in which:

FIG. 1 is a diagrammatic side elevational view of a telephone handset according to our invention; and FIGS. 2—5 are similar view of modified handsets representing further embodiments.

The handset shown in FIG. 1 has a housing consisting of two parts 1′ and 1″ of unequal length, interconnected by a hinge E, the free ends of parts 1′ and 1″ carrying an earpiece 2 and a mouthpiece 3, respectively. The maximum distance between the two transducers 2 and 3 is represented by the dot-dash line C constituting the hypotenuse of a triangle ABC whose longer leg A is in line with the earpiece-carrying face of part 1′ and passes through the pivotal axis of hinge E. When in their operating position, illustrated in full lines, the parts 1′, 1″ include with each other an obtuse angle $\pi-\alpha$, equal to the angle between the perpendicular to the plane of leg A and the junction J of the bases of the two housing parts; as shown in subsequent embodiments, this angle may be increased to 180°.

In the folded-up or rest position, part 1″ comes to lie against the aforementioned face of part 1′ as indicated in dotted lines at F. In the operating position (full lines), earpiece 2 and mouthpiece 3 occupy substantially the same relative position as in a conventional one-piece telephone receiver.

Figure 2:
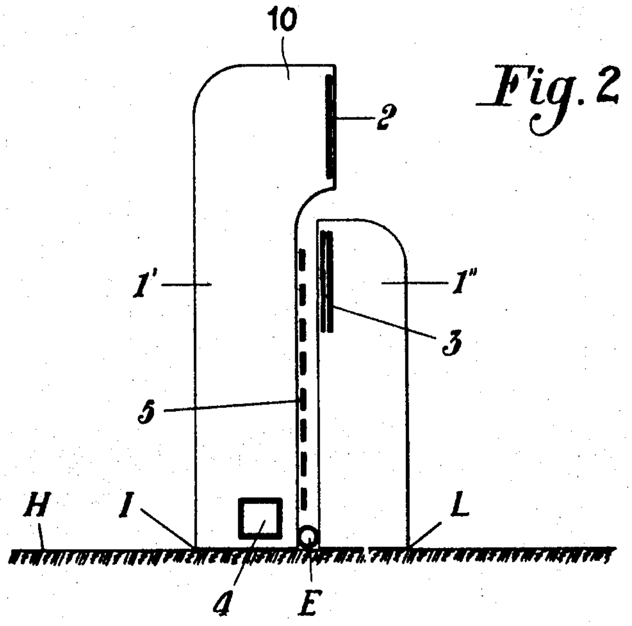

In the embodiment of FIG. 2, the parts 1′ and 1″ have flat bottoms or bases I and L, perpendicular to their contacting faces, by which they rest on the surface H of a table or other support when folded up into an inoperative position. Part 1′ also carries a hook switch 4 and a dial 5, the latter being bracketed by the two parts in the illustrated rest position so as to confront the mouthpiece 3. Switch 4, illustrated diagrammatically, may be of the type disclosed in the above mentioned Ferrari et al. application Ser. No. 590,865. It will further be noted that, in this embodiment as well as in the modifications described hereinafter, the earpiece 2 is mounted on an enlarged terminal portion or head 10 of part 1′ overhanging both the dial 5 and the part 1″ when the latter is swung up against the elongated stem portion of the former.

Figure 3:
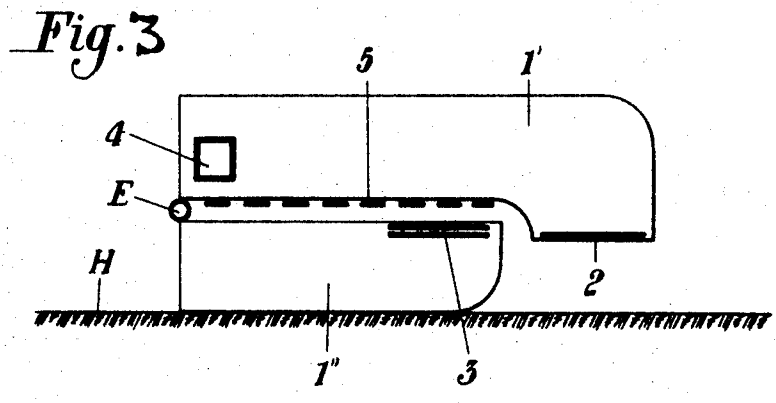

FIG. 3 shows an arrangement according to which the same handset lies on the plane H by only one of its parts, such as part 1″. This arrangement offers a complete protection against dust for all essential elements of the handset (mouthpiece 3, earpiece 2 and dial 5) and also an improved stability for the set, besides allowing the larger part 1′ to be handled more easily since the user can grip it at a point closer to the hinge E.

Figure 4:
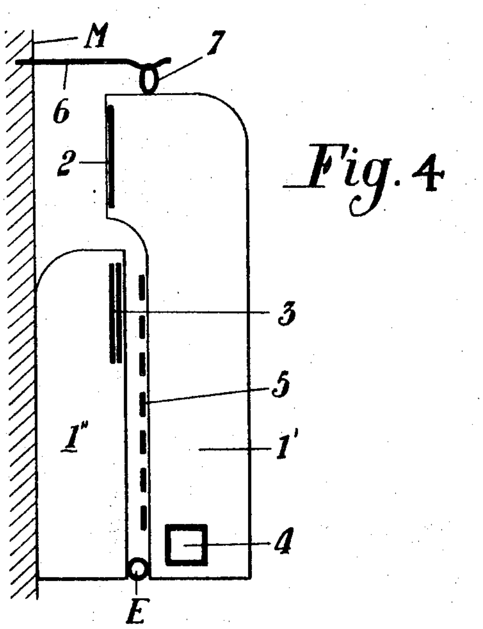

FIG. 4 shows the handset according to this invention suspended from a wall by the hook 6 and the eyelet 7. The wall has been shown in this instance at M.

Figure 5:
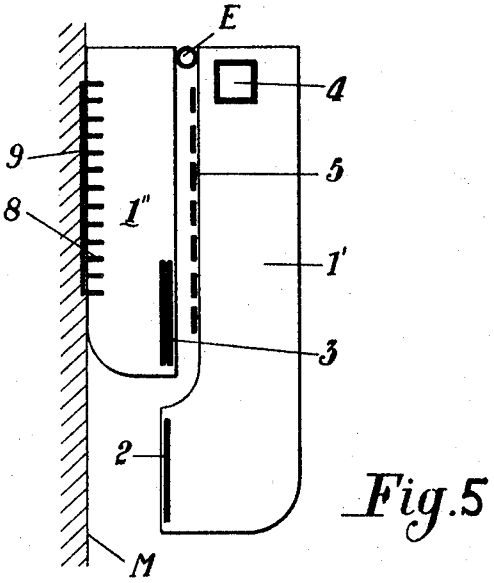

FIG. 5 shows the case wherein the closed handset is suspended from the wall M by means of a permanent magnet 8 carried by the part 1″, in cooperation with an iron plate or armature 9 fixed to the wall M.

We claim:

1. A telephone handset comprising a housing subdivided into a longer first part and a shorter second part with flat bottoms perpendicular to their longitudinal dimension, hinge means articulatedly interconnecting respective bottom edges of said parts for relative swinging between a spread-out position in which said parts angularly adjoin each other and a folded position in which said parts lie alongside and substantially parallel to each other, said first part having a terminal portion remote from its bottom extending beyond the free end of said second part, a first transducer on said terminal portion and a second transducer on said free end closer to said hinge means than said first transducer, one of said transducers including an earpiece, the other of said transducers including a mouthpiece, said flat bottoms being coplanar in said folded position and forming a base for resting said housing on a supporting surface.

2. A telephone handset as defined in claim 1 wherein said terminal portion forms an enlarged head partly overhanging said free end in said folded position, said first transducer standing clear of said free end in said folded position.

3. A telephone handset comprising a housing subdivided into a longer first part and a shorter second part, hinge means articulatedly connecting an end of said first part to an edge of said second part for relative swinging between a spread-out position in which said parts angularly adjoin each other and a folded position in which said parts lie alongside and substantially parallel to each other, said first part having an elongate stem portion terminating beyond the free end of said second part in an enlarged head partly overhanging said free end in said folded position, a first transducer on said head and a second transducer on said free end closer to said hinge means than said first transducer, one of said transducers including an earpiece, the other of said transducers including a mouthpiece, said first transducer standing clear of said free end in said folded position with said second transducer closely spaced from and parallel to said stem portion.

4. A telephone handset as defined in claim 3 wherein said first transducer is a receiver including said earpiece.

5. A telephone handset as defined in claim 3, further comprising call-selection means mounted on said stem portion between said hinge means and said head.

6. A telephone handset as defined in claim 5 wherein said call-selection means comprises a dial confronting said mouthpiece in said folded position.

7. A telephone handset as defined in claim 3 wherein said first and second parts are provided with flat bottoms near said hinge means, said first and second parts adjoining each other in said folded position along a plane substantially perpendicular to at least one of said bottoms.

8. A telephone handset as defined in claim 7 wherein the other of said bottoms is inclined with reference to said plane whereby said parts include with each other an obtuse angle in their spread-out position in which said bottoms lie flat against each other.

9. A telephone handset as defined in claim 7 wherein said bottoms are perpendicular to said plane and coplanar in said folded position for facilitating a resting of said housing on a supporting surface.